April 12, 1927.
J. H. CANNON
1,624,214
BROILER
Filed July 13, 1926
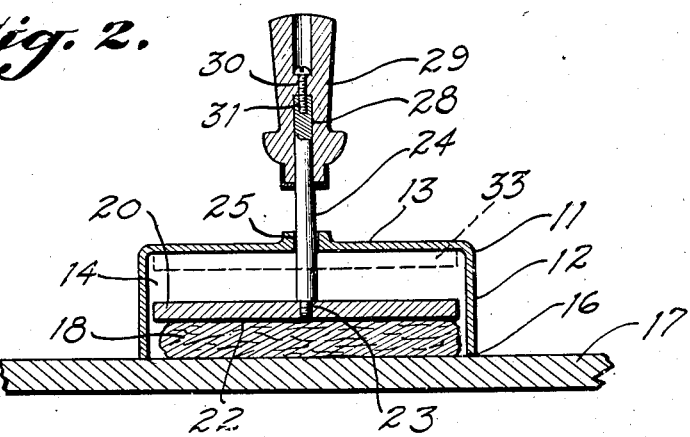
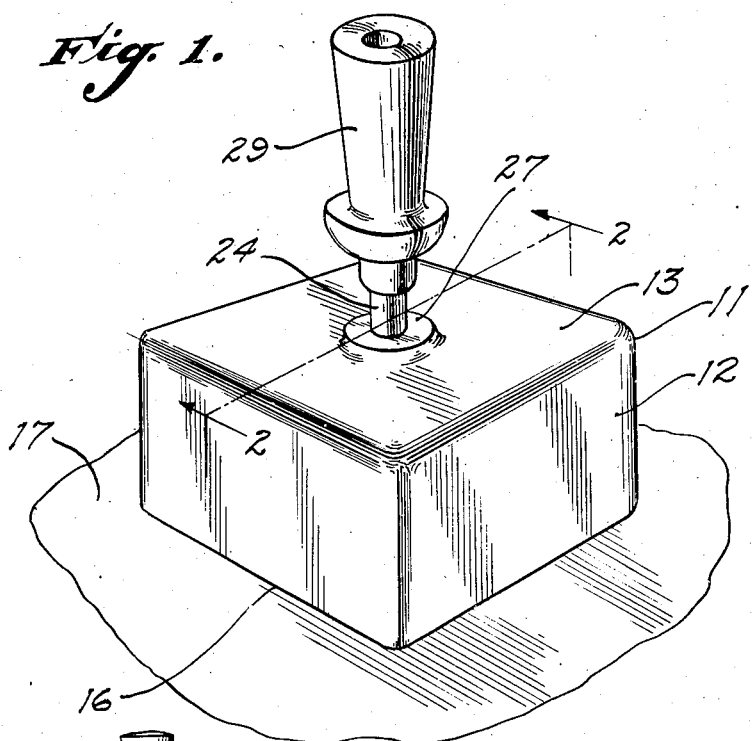
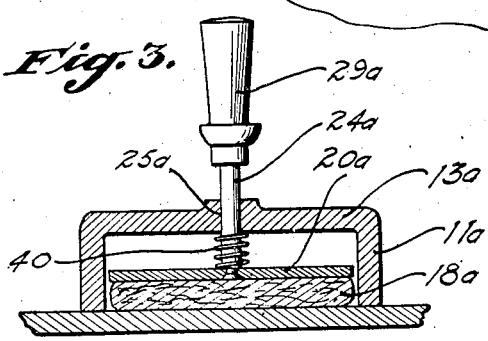
INVENTOR
JAMES H. CANNON,
BY
ATTORNEY.

Patented Apr. 12, 1927.

1,624,214

UNITED STATES PATENT OFFICE.

JAMES H. CANNON, OF LOS ANGELES, CALIFORNIA, ASSIGNOR TO CANNON ELECTRIC DEVELOPMENT COMPANY, OF LOS ANGELES, CALIFORNIA, A CORPORATION OF CALIFORNIA.

BROILER.

Application filed July 13, 1926. Serial No. 122,136.

My invention relates to a novel broiler for use in cooking steaks, chops and other foodstuffs in the form of slices. When a slice of meat or the like is cooked upon a hot plate, the heat causes it to curl so that the edges and sometimes the center of the meat is not in contact with the heating element. As a result the meat is not cooked evenly. The portions in contact with the heating element are cooked slightly more than the portions which are not in contact. Not only is the proper cooking of the meat incomplete but the appearance of it after it is cooked is detracted from. Much of the flavor of the meat is lost in the vapors which escape during the cooking.

It is an object of this invention to provide an improved form of broiler adapted to hold a slice of meat flatly against the cooking element, thus preventing curling of the meat, and adapted to enclose the meat in order to prevent a material escape of flavor therefrom.

Other objects and advantages of the invention will be made evident hereinafter.

Referring to the drawing in which I illustrate one form of my invention,

Fig. 1 is a perspective view of the broiler of my invention.

Fig. 2 is a vertical section taken through the broiler as indicated by arrows 2—2 of Fig. 1.

Fig. 3 is a vertical section showing a modified form of the invention.

The form of the invention shown in the drawing has a hood 11 providing side walls 12 and a top wall 13. The side walls and top wall 12 and 13 cooperate to provide a broiling chamber 14 which is rectangular in cross section. Lower edges 16 of the walls 12 of the hood 11 are adapted to engage the upper face of a heating element 17 when the hood 11 is enclosing a slice of meat, such as represented by the numeral 18 of Fig. 2. Situated within the broiling chamber 14 above the meat 18 is a pressure applying plate 20 which is rectangular in cross section and is slightly smaller in cross section than the broiling chamber 14. A lower face 22 of the plate 20 is adapted to engage the upper face of the meat 18. The plate 20 is of sufficient weight to prevent the meat 18 from curling. Threadedly secured to the plate 20, as indicated at 23, is a rod 24, which rod 24 is extended upward through an opening 25 formed in the upper wall 13 of the hood 11. The opening 25 is surrounded by an annular boss 27. The upper end of the rod 24 extends into a cavity 28 of a handle 29. The handle 29 is provided with a screw 30 which is threaded into a socket 31 formed in the upper end of the rod 24, thus securing the handle 29 thereto.

In using the invention the piece of meat 18 is first placed on the heating element 17. The broiler of the invention is handled by manually engaging the handle 29. The hood 11 when the broiler is being placed over the meat 18 is supported by the upper face of the plate 20, the plate 20 occupying a position indicated by dotted lines 33 of Fig. 2. As the broiler is lowered into place the lower edges 16 of the hood 11 engage the heating element 17. The plate 20 then moves downward relative to the hood 11 into engagement with the upper face of the meat 18. Pressure may then be manually applied by the plate 20 on the meat 18 by pressing downward on the handle 29. This effectively flattens the meat so that the entire lower surface thereof is in engagement with the heating element 17. The manual pressure is then released, but the weight of the plate 20, the rod 24, and the handle 29 is still applied to the meat 18 and is sufficient to hold it in flat position.

The hood 11 provides the broiling chamber 14 which prevents the vapors arising from the meat 18 from escaping. It is well known that considerable flavor of meat when it is cooked is lost by vaporization. In my invention, vaporization is reduced to a minimum and any vapors which are formed are prevented from escaping, being retained in adjacency to the piece of meat. When one side of the meat is done, the broiler may be lifted by engaging the handle 29 and the meat turned, after which the broiler may be replaced in the manner previously illustrated.

The important part of the invention, as should be clear from the foregoing description, resides in the provision of a hood 11 for preventing the loss of vapor by vaporization and the plate 20 for preventing the meat from curling. The use of the handle whereby manual pressure may be applied to the meat at the time the hood is placed over it is also important to the invention. If desired, the handle 29 may have a separate weight member placed thereon. This weight member could have a socket into which the handle 29 could extend.

Referring to Fig. 3, the modified form of my invention consists of a hood 11ª which is made very heavy so as to have considerable weight. A plate 20ª is provided, this plate being made somewhat lighter than the plate 20 shown in Figs. 1 and 2. Extending from the plate 20 is a plunger 24ª which extends through an opening 25ª to the exterior of the hood 11ª, to the outer end of which a handle 29ª is attached. Compressed between an upper wall 13ª of the hood 11ª and the plate 20ª is a coil spring 40. After the hood 11ª has been placed over the meat 18ª, the coil spring 40 forces the plate 20ª against the meat and prevents it from curling. The hood 11ª is sufficiently heavy so that it will not be displaced by the pressure of the spring thereon.

From the foregoing description it will be seen that different modifications of the invention may be made, all of which are included in the spirit and scope of the invention.

I claim as my invention:

1. A broiler comprising: a hood arranged to be supported on a heating element, said hood being arranged for enclosing a piece of meat being cooked on said heating element, thus preventing an escape of flavor; a plate in said hood adapted to pressurally engage said meat in order to hold said meat flatly against said heating element; a rod secured to said plate and extended through an opening in the upper part of said hood; and a handle attached to the outer end of said rod.

2. A broiler comprising: a hood arranged to be supported on a heating element, said hood to be adapted for enclosing a piece of meat being cooked on said heating element, thus preventing an escape of flavor; a plate in said hood adapted to engage said meat; and yieldable means engaging said hood and said plate for holding said meat flatly against said heating element.

3. A broiler comprising: a hood arranged to be supported on a heating element, said hood being arranged for enclosing a piece of meat being cooked on said heating element, thus preventing an escape of flavor; a plate in said hood adapted to pressurally engage said meat in order to hold said meat flatly against said heating element; and means connected to said plate whereby said plate and said hood may be lifted.

4. A broiler comprising: a hood arranged to be supported on a heating element, said hood being arranged for enclosing a piece of meat being cooked on said heating element, thus preventing an escape of flavor; a plate in said hood adapted to pressurally engage said meat in order to hold said meat flatly against said heating element; a rod secured to said plate and extended through an opening in the upper part of said hood; a handle attached to the outer end of said rod; and yieldable means engaging said hood and said plate.

In testimony whereof, I have hereunto set my hand at Los Angeles, California, this 8th day of July, 1926.

JAMES H. CANNON.